US011100231B2

United States Patent
Fulp et al.

(10) Patent No.: US 11,100,231 B2
(45) Date of Patent: Aug. 24, 2021

(54) METHODS, SYSTEMS AND COMPUTER READABLE MEDIA FOR PROVIDING RESILIENT COMPUTING SERVICES USING SYSTEMS DIVERSITY

(71) Applicant: Wake Forest University, Winston Salem, NC (US)

(72) Inventors: Errin Wesley Fulp, Winston-Salem, NC (US); Howard Donald Gage, Jr., Mooresville, NC (US); William Hansel Turkett, Jr., Winston-Salem, NC (US); David Jerome John, Winston-Salem, NC (US); Daniel Alberto Canas, Winston-Salem, NC (US)

(73) Assignees: Errin Wesley Fulp, Winston-Salem, NC (US); Howard Donald Gage, Jr., Williston, VT (US)

( * ) Notice: Subject to any disclaimer, the term of this patent is extended or adjusted under 35 U.S.C. 154(b) by 227 days.

(21) Appl. No.: 15/766,885

(22) PCT Filed: Oct. 10, 2016

(86) PCT No.: PCT/US2016/056317
§ 371 (c)(1),
(2) Date: Apr. 9, 2018

(87) PCT Pub. No.: WO2017/062972
PCT Pub. Date: Apr. 13, 2017

(65) Prior Publication Data
US 2018/0293388 A1  Oct. 11, 2018

Related U.S. Application Data

(60) Provisional application No. 62/239,204, filed on Oct. 8, 2015.

(51) Int. Cl.
*G06F 21/57* (2013.01)
*H04L 29/06* (2006.01)
*G06F 21/55* (2013.01)

(52) U.S. Cl.
CPC .......... *G06F 21/577* (2013.01); *G06F 21/552* (2013.01); *G06F 21/57* (2013.01);
(Continued)

(58) Field of Classification Search
CPC . H04L 63/14; H04L 63/1425; H04L 63/1433; G06F 21/50; G06F 21/55; G06F 21/57; G06F 21/577; G06F 21/552
See application file for complete search history.

(56) References Cited

U.S. PATENT DOCUMENTS 8,839,426 B1 * 9/2014 Brueckner .......... G06F 11/1469
726/22
9,306,962 B1 * 4/2016 Pinto ....................... G06F 21/35
(Continued)

FOREIGN PATENT DOCUMENTS

EP  1 496 434 A2  1/2005

OTHER PUBLICATIONS

"An Evolutionary Cyber Defense for Resilient Computer Infrastructures," Cisco Research Meeting, Wake Forest University, pp. 1-35 (Jul. 2015).
(Continued)

Primary Examiner — Khang Do
(74) Attorney, Agent, or Firm — Jenkins, Wilson, Taylor & Hunt, P.A.

(57) ABSTRACT

Methods, systems, and computer readable media for providing resilient computer services using systems diversity include a head device for receiving requests from clients and for replicating the requests. Variates each receive a request replicated from the head device, process the request, and
(Continued)

generate a response to the request. At least some of the variates are different in configuration from the other. The response processing server receives the responses from the variates, selects one of the responses, and delivers the response to the client via the head device. Configuration or systems diversity and adaptation to threats and failures over time may be achieved using adaptive algorithms.

22 Claims, 6 Drawing Sheets

(52) U.S. Cl.
CPC .......... *H04L 63/14* (2013.01); *H04L 63/1425* (2013.01); *H04L 63/1433* (2013.01)

(56) References Cited

U.S. PATENT DOCUMENTS

| | | | | |
|---|---|---|---|---|
| 9,355,008 | B2* | 5/2016 | Myers | G06F 11/3452 |
| 9,444,785 | B2* | 9/2016 | Jungck | H04L 29/12066 |
| 10,250,603 | B1* | 4/2019 | Roth | H04L 63/1433 |
| 2002/0010855 | A1* | 1/2002 | Reshef | G06F 21/554 |
| | | | | 713/164 |
| 2006/0047794 | A1* | 3/2006 | Jezierski | H04L 41/0823 |
| | | | | 709/221 |
| 2006/0156299 | A1 | 7/2006 | Bondi et al. | |
| 2007/0094163 | A1* | 4/2007 | Bowerman | G06N 3/126 |
| | | | | 706/13 |
| 2008/0222729 | A1* | 9/2008 | Chen | G06F 21/566 |
| | | | | 726/24 |
| 2009/0007265 | A1 | 1/2009 | Torre et al. | |
| 2010/0192195 | A1* | 7/2010 | Dunagan | G06F 21/577 |
| | | | | 726/1 |
| 2011/0047413 | A1 | 2/2011 | McGill et al. | |
| 2011/0214182 | A1 | 9/2011 | Adams et al. | |
| 2013/0285855 | A1* | 10/2013 | Dupray | G01S 5/0278 |
| | | | | 342/451 |
| 2014/0090071 | A1* | 3/2014 | Salehie | H04L 63/1408 |
| | | | | 726/25 |
| 2014/0226176 | A1* | 8/2014 | Iwakami | H04N 1/00013 |
| | | | | 358/1.14 |
| 2014/0310810 | A1* | 10/2014 | Brueckner | H04L 63/1416 |
| | | | | 726/23 |
| 2015/0309831 | A1* | 10/2015 | Powers | G06F 16/24565 |
| | | | | 718/1 |
| 2016/0191474 | A1* | 6/2016 | Hinh | G06Q 30/04 |
| | | | | 713/154 |
| 2017/0034198 | A1* | 2/2017 | Powers | G06F 21/552 |
| 2017/0078165 | A1* | 3/2017 | Hildebrand | G06F 11/3409 |
| 2017/0359308 | A1* | 12/2017 | Pal | H04L 63/0281 |

OTHER PUBLICATIONS

Lomas, "YC-Backed Cymmetria Uses Virtual Machines to Decoy and Detect Hackers," http://techcrunch.com/2015/06/27/cymmetria/, pp. 1-10 (Jun. 27, 2015).
Zhou, "Measurements Associated with Learning More Secure Computer Configuration Parameters," Thesis, Wake Forest University, pp. 1-113 (May 2015).
"Targeted Defense Against Targeted Attacks" Cymmetria, http://www.cymmetria.com, pp. 1-9 (2015).
Fulp, "Evolving Secure Computer Intrastructures," Wake Forest University, pp. 1-58 (Oct. 27, 2014).
Fulp, "Using Evolution as a Cyber Defense," Wake Forest University, pp. 1-39 (Aug. 13-15, 2014).
Smith, "Evolutionary Strategies for Secure Moving Target Configuration Discovery," Thesis, Wake Forest University, pp. 1-144 (May 2014).
Lucas et al., "An Initial Framework for Evolving Computer Configurations as a Moving Target Defense," Slides, Wake Forest University, pp. 1-11 (Apr. 10, 2014).
Lucas et al., "An Initial Framework for Evolving Computer Configurations as a Moving Target Defense," Wake Forest University, pp. 1-4 (2014).
Fulp, "Nature-Inspired Solutions for Cyber Security," Wake Forest University, pp. 1-39 (Oct. 29, 2013).
Lucas, "An Automated System for Evolving Secure Systems," Project Report, Wake Forest University, pp. 1-95 (May 2013).
Crouse et al., "Improving the Diversity Defense of Genetic Altorithm-Based Moving Target Approaches," Wake Forest University, pp. 1-12 (Jun. 11, 2012).
Crouse et al., "Improving the Diversity Defense of Genetic Algorithm-Based Moving Target Approaches," Wake Forest University, pp. 1-8 (Jun. 11, 2012).
Crouse et al., "A Moving Target Environment for Computer Configurations Using Genetic Algorithms," Slides, Wake Forest University, pp. 1-16 (Nov. 1, 2011).
Crouse et al., "A Moving Target Environment for Computer Configurations Using Genetic Algorithms," Wake Forest University, pp. 1-7 (Nov. 1, 2011).
Odell et al., "Using Probability Densities to Evolve more Secure Software Configurations," SafeConfig'15, pp. 1-6 (Oct. 12, 2015).
John et al., "Evolutionary Based Moving Target Cyber Defense," Wake Forest University, Slides, pp. 1-25 (Jul. 13, 2014).
John et al., "Evolutionary Based Moving Target Cyber Defense," GECCO'14, pp. 1-8 (Jul. 12-16, 2014).
Notification of Transmittal of the International Search Report and the Written Opinion of the International Searching Authority, or the Declaration for International Application No. PCT/US2016/056317 (dated Jan. 17, 2017).

\* cited by examiner

Evolutionary Algorithm Processes

- Maintain a *population* (pool) of chromosomes and perform 3 processes selection    crossover    mutation

- Selection identifies parents for new chromosomes (configurations)
  - Roulette wheel selection, chromosomes weighted based on fitness
- Crossover combines selected chromosomes to create new chromosomes
  - Multi-point crossover used
- Randomly change traits (configuration parameter settings)
  - Provides diversity and exploration of solution space

METHODS, SYSTEMS AND COMPUTER READABLE MEDIA FOR PROVIDING RESILIENT COMPUTING SERVICES USING SYSTEMS DIVERSITY

PRIORITY CLAIM

This application claims the priority benefit of U.S. Provisional Patent Application No. 62/239,204, filed Oct. 8, 2015, the disclosure of which is incorporated herein by reference in its entirety.

TECHNICAL FIELD

The subject matter described herein relates to providing computing services. More particularly, the subject matter described herein relates to methods, systems, and computer readable media for providing an automated approach for providing resilient computing services using systems diversity.

BACKGROUND

Our everyday lives are becoming more and more reliant on computers (more generally, computing systems). For example, computing systems control the function of your car, they conduct 80% of the trades on Wall Street, and they manage the distribution of electric power in the United States. In many cases, the failure or an attack on a computing system may have a high-impact. For example, a recent failure of a United Airlines computing system grounded all flights nationwide. In another recent case, an attack on the United States Office of Personnel Management's computing systems resulted in the theft of social security numbers and other personal information for 22 million people. As a result, ensuring that these computing systems are resilient to attacks and failures is especially important.

Resilient computer systems have the ability to evade, withstand, and recover from attacks and failures. Unfortunately given the size and complexity of current computing systems, providing the necessary resiliency is difficult to achieve. Furthermore, implementing the necessary resiliency for a computing system is not a one time task. Computing systems are continually being modified through upgrades and patches as well as being subjected to new and different attacks. Due to this, an automated approach to providing computer system resiliency is critical.

Accordingly, there exists a need for methods, systems, and computer readable media for providing resilient computing services using systems diversity.

SUMMARY

Methods, systems, and computer readable media for providing resilient computing services using systems diversity include a head device (server or simple network traffic duplicator) for receiving requests from clients and for replicating the requests. Variate servers each receive a request replicated from the head device, process the request, and generate a response to the request. The variate servers are functionally equivalent but are different in implementation from the other. These differences could range from hardware differences to software differences; however, how they are different is noted. The response processing server receives the responses from all the variate servers, selects one of the responses, and delivers the response to the client via the head device.

In the absence of an attack or failure, all responses should be identical. If they differ, then this is indicative of an attack or failure. In this case, there would be two groups of responses: those that are represent good responses and those that represent responses generated due to an attack or failure. The response server would forward one of the 'good' responses back to the head device (not directly to the client). Further, if there are differences in responses, this information can be used to by the system administrator or automated means to identify the attack vector or cause of failure.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes a new approach for providing computer system resiliency. The approach involves, in one implementation, a unique application of adaptable search algorithms and virtualization to automatically manage and defend computer systems. The technique identifies multiple secure and functional computer systems in response to current needs and threats. These systems differ, thus providing systems diversity. The dynamic nature of the approach increases the complexity and cost of an attack, while the adaptive nature of the computer system can improve resiliency and reduce the exposure to failures and vulnerabilities. The approach may be applicable to a wide variety of computing systems in the public and private sector. It will be understood that various details of the presently disclosed subject matter may be changed without departing from the scope of the presently disclosed subject matter. Furthermore, the foregoing description is for the purpose of illustration only, and not for the purpose of limitation.

Simple Web-Scenario Description

Figure 1:
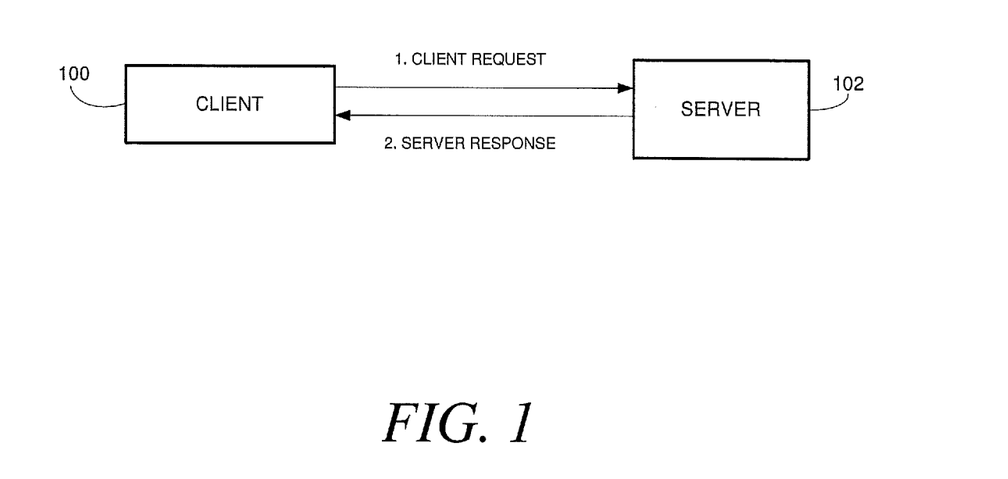
FIG. 1 is a block diagram illustrating a traditional transaction between a server and a client.

Consider an example of a person shopping on-line where the person uses a browser (Internet Explorer, Google Chrome, etc.) to contact the vendor's web-server (the computing system) over the Internet. As shown in FIG. 1, the process typically starts with a client 100 contacting web-server 102 for information. Client 100 may be a computing device operated by a user. The user may initiate the request by interacting with a web browser that executes on client 100. The web browser generates the request, typically an HTTP request, and sends the request to the IP address of web server 102. Web server 102 responds by providing the data requested by the request. For example, the data may be one file or a group of files necessary to display a web page corresponding to a link selected by the user. This type of "client-server" interaction continues, often with multiple conversations, until the user has finished shopping.

Unfortunately, the web server in this case, and as in many cases, is a single point of failure. If the server is vulnerable, it is possible that an attacker can generate a sequence of requests that will cause the system to fail (availability attack), provide unauthorized information (confidentiality attack), and/or allow the attacker to modify information stored at the server (integrity attack). These types of attacks are unfortunately very common and often successful. The system vulnerability could be the result of misconfiguration, poorly implemented software (including unpatched systems), and/or unknown threats. Given the complexity of most computing systems, any of these causes are likely.

Redundancy Approaches

Often system administrators use redundancy (maintaining a set of spares) to provide resiliency for critical systems. In this case multiple identical systems are available as back-up if the primary system fails. While this approach works for general hardware failure cases (e.g. disk drive or processor failure), it can be the worst possible approach for cyber security and software failure. In these failure cases, the vulnerabilities are duplicated. If the attack is successful against one, it will also be successful with all the spares in the set. Similarly if there is a software error that causes the unintentional failure, then all the systems will fail under the same conditions. Having multiple systems available is an important design approach for resiliency, but these systems must also be dynamic and diverse.

The following example illustrates problems associated with redundancy where every system in the redundant system is identical.

Issues with Using Replicates for Resiliency

Consider a company that uses multiple identical servers to improve resilience. Using this approach, only one of the replicate servers is used to interact with the client. If the "active" server has an issue and fails, then one of the other servers can be used to continue any network transactions. In this case, the replicates help resiliency when the failure is a "chance event." Unfortunately, this is not the case for failures that will repeat, such as an attacker exploiting a vulnerability or a hardware and/or software defect. In this case, the attacker will simply repeat the attack for each of the replicates, and as a result, the replicates do not offer any protection. Therefore, using replicates can improve performance by distributing requests across multiple servers, but are still susceptible to attack.

New Approach for Resilient Computing Systems

The present approach, called n-Resilient, also uses multiple systems to provide resiliency; however, one significant difference is that the systems, while functionally equivalent (under normal operation provide the same answer), differ in implementation from one another. As a result, it is unlikely that a vulnerability (security or failure oriented) will be shared by all instances of the system at any point in time. Furthermore, the approach simultaneously engages multiple systems instead of having an idle set of "reserves," and selects one system to interact per client request. This provides diversity in the environments in which answers are formed, but not necessarily with the answers. Diversity in content delivery can disable the attacker's reconnaissance ability to learn about vulnerabilities. Finally, the approach also uses adaptive algorithms to autonomously manage the system and servers used to answer a client's request. As a result, the management component learns from the performance of previous generations and adapts to the current computing environment. This behavior includes the ability to improve performance based on user demand, but also allows the discovery of more secure configurations in response to current threats. Diversity in the content delivery described herein includes diversity in configuration, such as application configuration, operating system configuration, hardware configuration, virtualization configuration, etc. The term, "diversity in configuration", as used herein, includes different parameters within a particular system aspect, such as an operating system, as well as different versions of a system aspect (e.g., Windows versus OS X operating system). For example, each system or server that provides a response to a request from the client may differ from other systems or servers in one configuration or system aspect. Examples of configuration or system aspects that may differ include operating system, hardware platform, file permissions, file directory structure, or other configuration or system aspects. The terms "configuration aspect" and "system aspect" are used interchangeably herein to refer to any aspect of a computing system that can be changed while maintaining functional equivalence with another computing system.

Computing diversity also provides a means for identifying problematic systems. Since all the systems are engaged in a client request, the responses can be compared to determine which system is returning inconsistent answers (replies). In addition, since the system differences are known, it is possible to identify exactly what is causing the issue.

Web-Scenario Using n-Resilient

Figure 2:
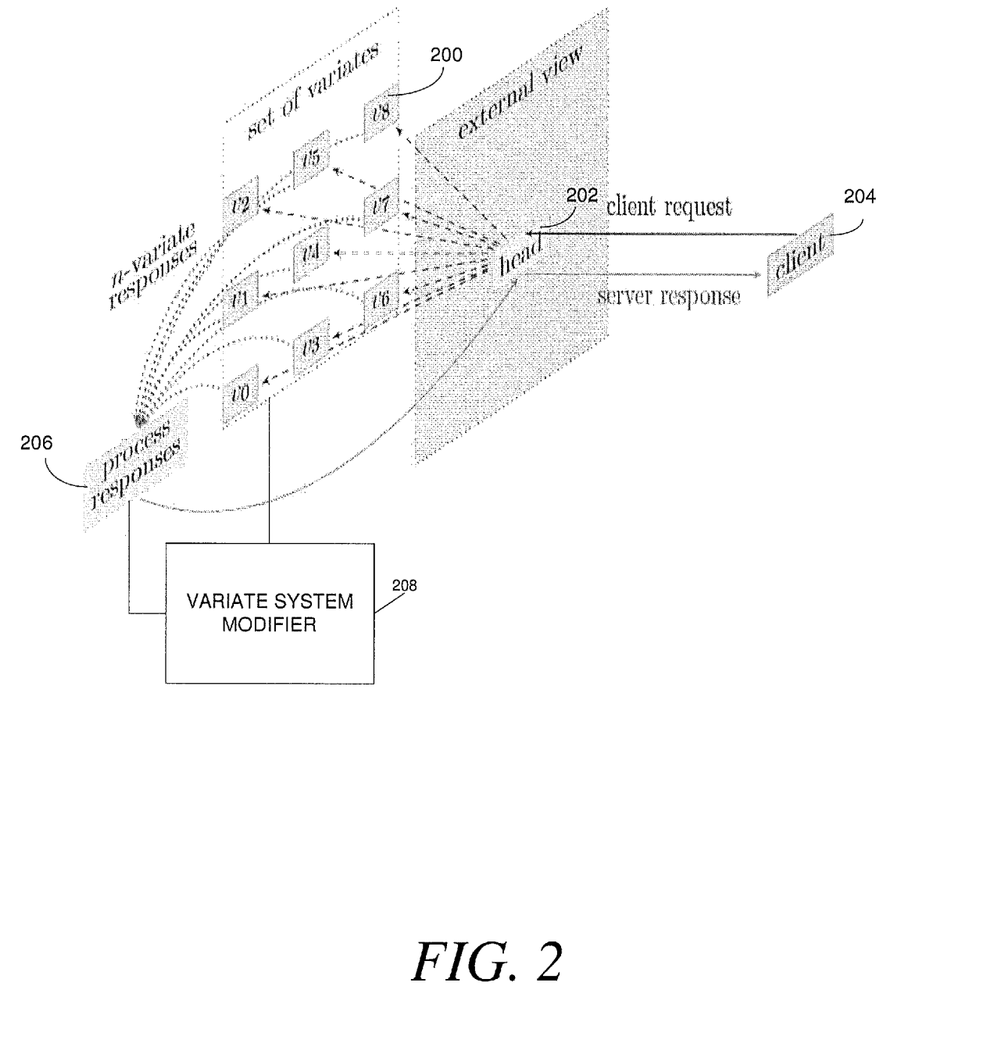
FIG. 2 is a block diagram illustrating an example transaction between a client and in this case a web-server using an n-resilient approach (explained below) according to an embodiment of the subject described herein.

Consider the same web-server scenario as above; however as seen in FIG. 2, multiple servers exist in a set using virtualization (computing hardware implemented in software). This allows multiple virtual computing systems to run on one physical computing system (noted as variates in the figure). In FIG. 2, variates 200 are located behind a head device 202. Head device 202 interacts directly with client 204. Each variate 200 produces a response to a request from a client. A response processing server 206 analyzes responses and selects one of the responses to deliver to the client via head device 202. In one embodiment, response processing server 206 may be an internal server that is not contactable from systems external to it, i.e., on the client facing side of head device 202, and is thus less vulnerable to attack than systems that are not behind head device 202. Response processing server 206 may also analyze the responses to identify vulnerabilities. A variate system modifier 208 may change the configuration of one or more variates 200 in response to detection of such vulnerabilities or over time. Variate system modifier 208 may utilize a genetic or evolutionary algorithm to change variate server configurations. An example of the application of a genetic or evolutionary algorithm to change variate server configuration will be described below.

In one exemplary embodiment, each variate 200 is designed to provide the same functionality (e.g., application level functionality), but may be implemented differently from other variates 200 and managed via a separate process. Client 204 (again, browsing the web) contacts the head device 202 and from the user's perspective there is only a single server managing requests. Head device 202 is responsible for replicating and forwarding the request to each of the servers in the array. Each variate 200 in the array receives the request, generates a response to the request, and forwards the response to processing server 206. The responses are collected at response processing server 206. Response processing server 206 compares the responses and determines which are valid or correct and selects, from the valid or correct responses, a single response to be delivered to client 204 via head device 202. Note that correctness is in reference to the information, not how the answer was produced. Furthermore, the ability to check answers across the set of variates provides an automatic way to determine if a system in the array has failed or been compromised, including zero day attacks (attacks that have never been encountered before).

Response processing server 206 may select a response using a suitable response selection algorithm that uses responses from a plurality of variate servers as candidates for serving a given request. The response selection algorithm may potentially select different variates to deliver responses to successive requests. For example, the response selection algorithm may select a response from a set of correct responses using a random or pseudo-random selection algorithm. The response selection algorithm may consider history, such as previously selected variates or responses, when making a selection of responses from the variates for a given request. For example, if the response from variate A is randomly selected in response to a first request, variate A may be removed from the set of potential candidates to service subsequent requests until all of the variates have provided at least one response that is selected to be provided to a requestor. Once all of the variates have had at least one response selected, all of the variates may be returned to the set of potential candidates for providing responses to subsequent requests.

The selected response may be forwarded to the client via the head device. The response to the next request may also be randomly or pseudo-randomly selected from a set of correct responses. This process repeats until the user has completed their transaction (obtained the information desired). How could an attacker be successful? An attacker would need a vulnerability that is common to all the variates in the set. Although this is theoretically possible, the systems diversity introduced makes this remote.

In one embodiment, each variate 200 may produce a response to a given request. In an alternate embodiment of the subject matter described herein, a subset of variates 200 may produce a response while another subset of variates 200 does not produce a response to a request. When a subsequent request is generated by the same or different client, a set of variates different from the set used to generate responses to the previous request may be used to generate the responses to the subsequent request.

Because response processing server 206 has the opportunity to review responses, response processing server 206 may also have visibility to security threats and failures, as described above. Thus, in response to detecting a security threat or failure, response processing server 206 may notify variate system modifier 208, which may produce a new generation of variates 200 by changing the configuration of one or more of variates 200 to be different from the previous generation. Any suitable algorithm may be used to select the new configuration. As described above, genetic or evolutionary algorithms may be used.

Figure 3:
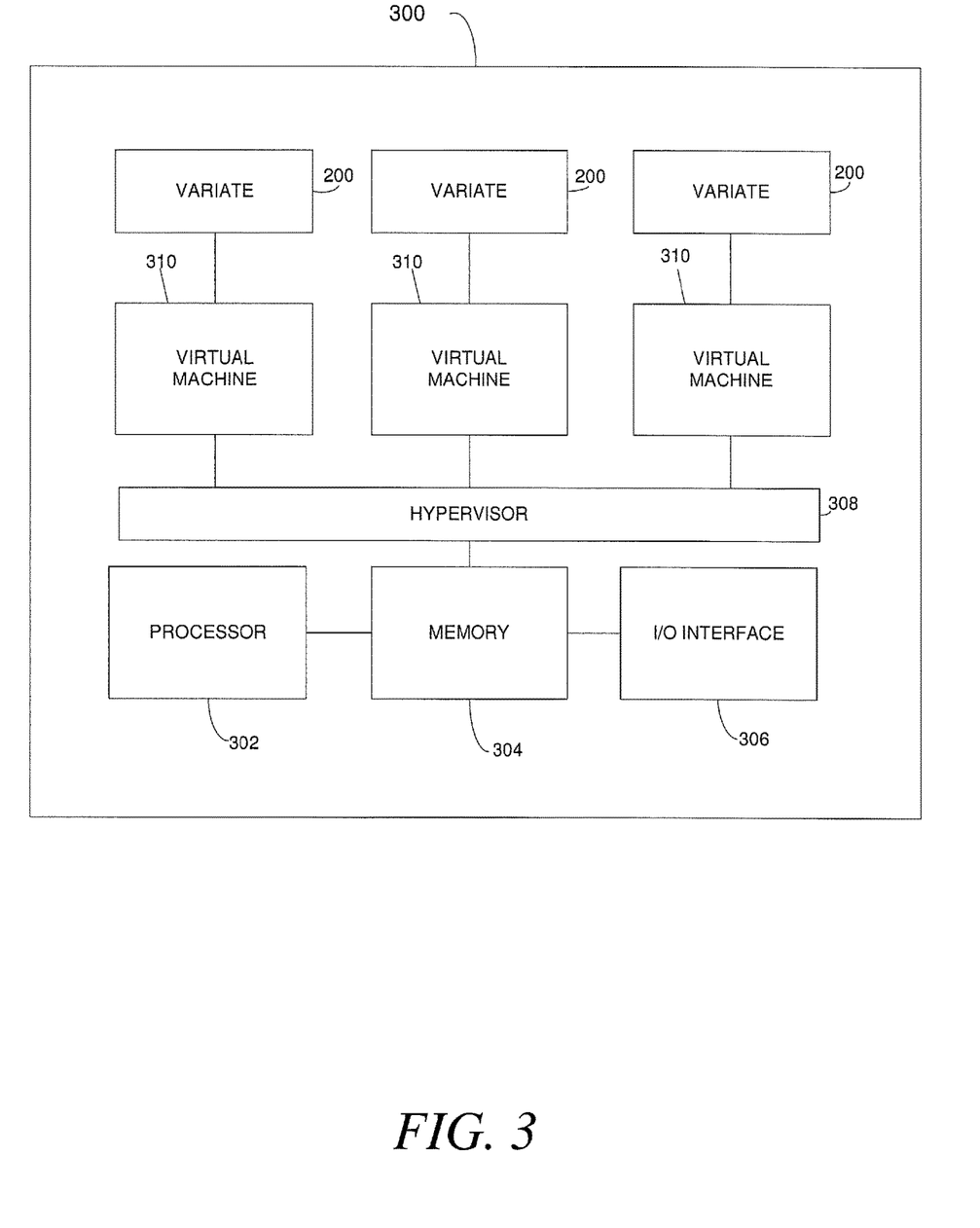
FIG. 3 is a block diagram illustrating an exemplary computing platform on which a head device, a response processing server, and variate servers may execute.

FIG. 3 is a block diagram illustrating an exemplary computing platform on which one or more of variates 200, head device 202, and response processing server 206 may execute. Referring to FIG. 3, the computing platform includes a processor 302 and at least one memory 304. The computing platform further includes at least one I/O interface 306 for communicating with external systems. If virtualization is used, a hypervisor 308 may virtualize underlying hardware resources, resulting in plural virtual machines 310. Variates 200, head device 202, client 204, and response processing server 206 may each execute on one of virtual machines 310. It should also be noted that variates 200, head device 202 and response processing server 206 may also execute on different physical machines. In the illustrated example, variates 200 execute on different virtual machines 310. Virtual machines 310 may differ in implementation from each other by providing different combinations of physical or virtual resources to variates 200. In another example of configuration or system variability, hypervisors of different type and/or from different vendors may be used for each variate 200.

Figure 4:
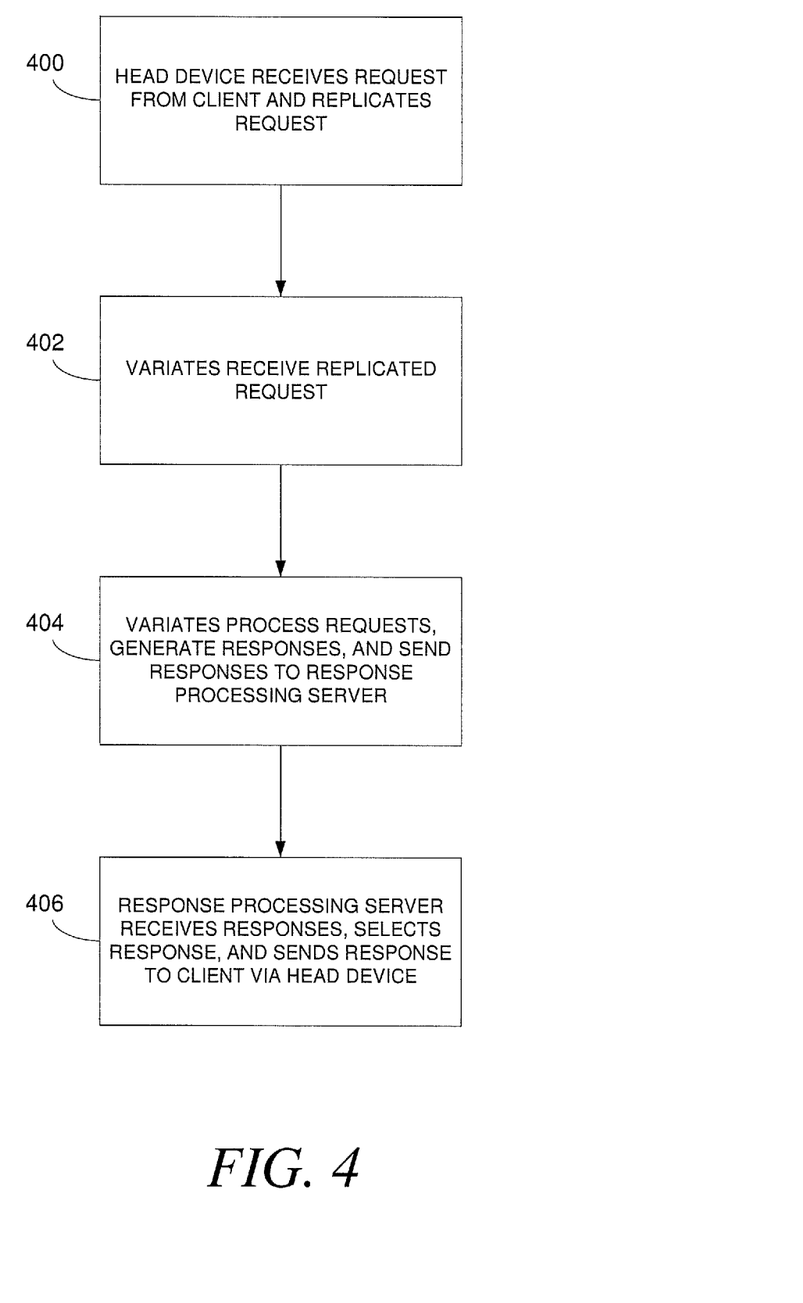
FIG. 4 is a flow chart illustrating an exemplary process for providing resilient computing services using systems diversity according to an embodiment of the subject matter described herein.

FIG. 4 is a flow chart illustrating exemplary process for providing resilient computing services according to an embodiment of the subject matter described herein. Referring to FIG. 4, in step 400, the head device receives a request from the client and replicates the request. For example head device 202 may receive a request and replicate the request internally to variates 200. In step 402, each variate 200 receives a request replicated from head device 202. As described above, in one example, the request may be a HTTP request for web services. In step 404, each variate server processes the request, generates a response to the request, and forwards the response to the response processing server. For example, variates 200 may each generate a response to a web page request or other request for computing services. At least some of the variate servers differ in implementation from each other. For example, variates 200 may differ in hardware platforms, operating systems, file systems, file permissions, virtual machine configuration, hypervisor vendor, hypervisor type, etc. In step 406, the response processing server receives the responses from the variate servers, selects one of the responses for delivery to the client, and delivers the response to the client via the head device. For example, response processing server 206 may send the selected response to client 204 via head device 202.

The following example illustrates advantages of the n-resilient approach.

Consider the same scenario as in the example above where a set of systems (web-servers) are used to provide resiliency. However, using the n-resilient approach each system has a different implementation. In this example, assume one web-server is a Debian-installed Apache server, another is an OSX-installed Hiawatha server, and another a Windows-installed Apache server. When a client request arrives each server is given the information and is allowed to create a response. The responses are then forwarded to the response-processor. If all the responses are equal, then there is no issue and one is randomly selected and forwarded to the client. However, consider the situation where the Debian-installed server response is incorrect (different) from the others. In this case, the Debian-installed server will be identified as problematic. In addition, it can be determined that the issue is likely associated with Debian, since the other Apache server (running Windows) was not affected. Therefore comparing the responses from the servers allows for the identification of an issue and the possible cause, which is not possible with traditional redundancy techniques. What about speed? n-Resilient can easily incorporate parallelization to increase the answer speed.

Figure 5A:
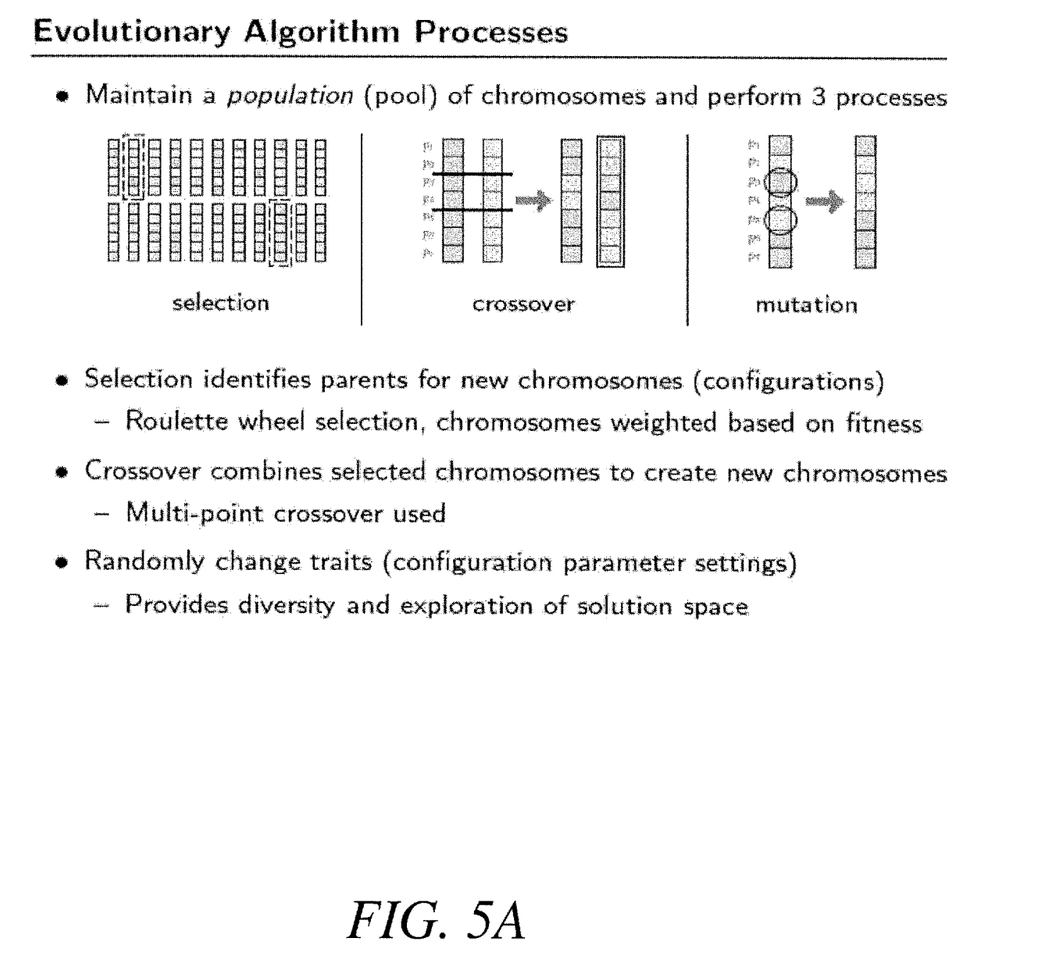
FIGS. 5A and 5B are diagrams illustrating the use of evolutionary algorithms as an example to identify security configurations.
Figure 5B:
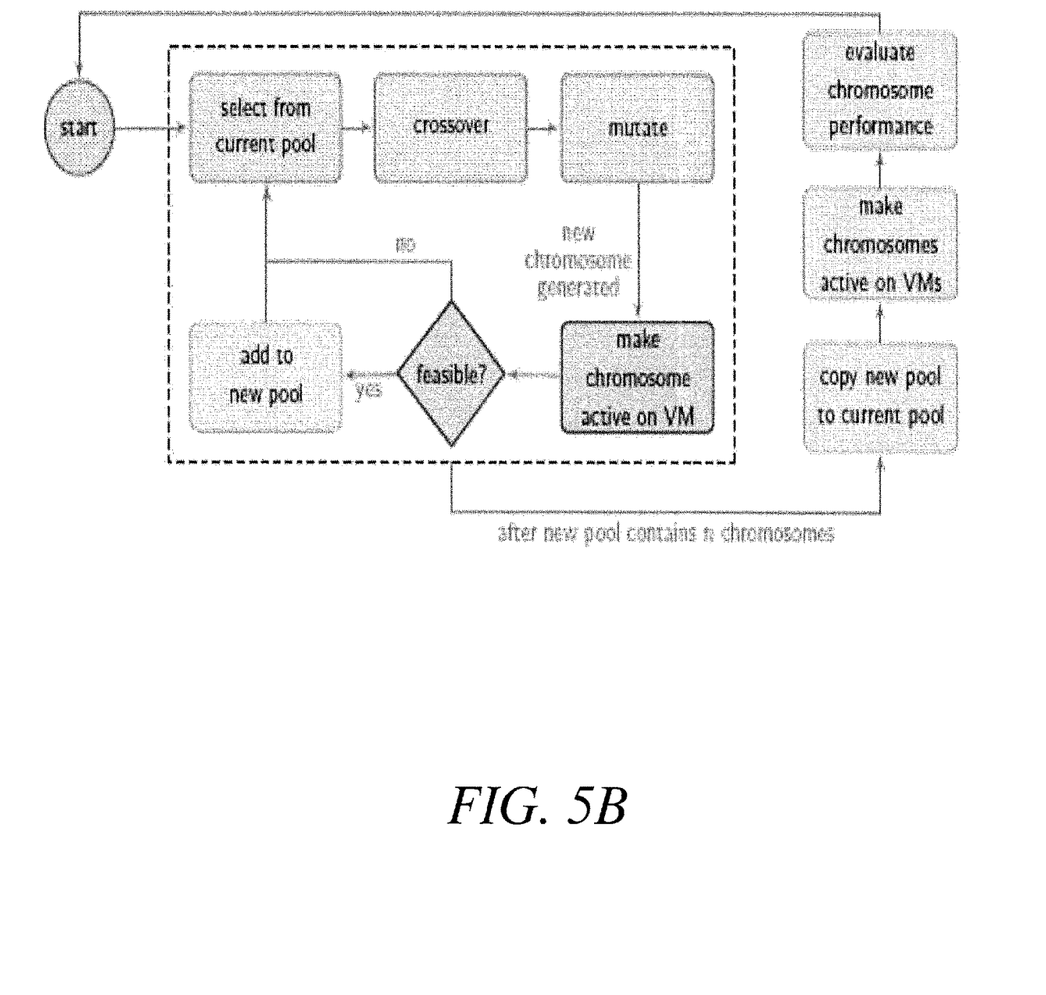

Application of Adaptable Algorithms to Change Population of Variate Server Configurations As stated above, adaptable algorithms may be used to alter the population of variate server configurations in response to detected vulnerabilities or to change the variate server configurations in the variate server population over time to provide a moving target defense against attacks. For example FIGS. 5A and 5B illustrate the use of an evolutionary or genetic algorithm to alter security configurations. In FIG. 5A, a pool of chromosomes is maintained. In this example, the chromosomes may contain sets of configuration parameters for individual variate servers. Alternatively, each chromosome may represent a family of variate server configurations, where each gene is a complete variate server configuration. In the first step of the process, parents are selected. Assuming each chromosome represents a set of configuration parameters for an individual variate server, the next step in the process is crossover, where the parent chromosomes are combined to create new chromosomes, which in this example results in one or more new sets of variate server configuration parameters. The next step is mutation, where traits (individual variate server configuration parameters) are randomly changed. The result of mutation is a new set of variate server configuration parameters.

In FIG. 5B, the next step after mutation is to make the chromosome active on a virtual machine. Continuing with the variate server example, a set of variate server configuration parameters may be made active on a VM. The new configuration is then evaluated to determine whether it is feasible. In the variate server example, determining whether a set of configuration parameters is feasible may include conducting a functionality test of the configuration to see if the configuration correctly processes a request in a test environment. If the configuration is feasible, the variate server configuration may be added to the family of variate servers. If the configuration is not feasible, the configuration may be discarded, and the selection process may be repeated. In an alternate implementation, the feasibility of proposed configurations may be evaluated on-the-fly by adding the new configurations to a pool of variates and observing behavior of the new configurations. The variates with the new configurations may be initially considered to be "on parole" during an evaluation period, and the response processing server may evaluate, but not select, their responses during the evaluation period.

After the new pool contains a specified number of variate server configurations, the configurations may be made active on VMs (e.g., in a live network), and the performance of the configurations may be evaluated with respect to vulnerabilities or other suitable metric. If a vulnerability is detected, the configuration that resulted in the vulnerability may be modified through the selection, mutation, and crossover process described above. Alternatively, the process in FIGS. 5A and 5B may be repeated over time to change the population of variate servers over time (either independently of or considering configurations that produced security vulnerabilities) and thereby create a moving target for attacks.

Other Variate Examples and Analysis of Variate State Changes

According to another aspect of the subject matter described herein, variates 200 may be sensors or other devices with different hardware and/or software configurations, and response processing server 206 may utilize variate diversity and variate state changes caused by previous requests to determine whether to allow a request to be serviced at all and which response to choose for a given request. For example, the variates may be an array of systems that are functionally equivalent but are configured differently (software and/or hardware). System diversity is helpful for two reasons, 1) diversity decreases the likelihood that a single input will cause an issue for all systems (a subset will likely survive), and 2) comparison of the systems can be used to identify the specific problem. In one exemplary implementation, the client input is given to all of the variates in the array and a response is chosen from those variates that remain in a "safe" (e.g., non-failure) state. Thus, one aspect of the subject matter described herein can include analyzing variate state information to determine which response to be selected in response to a given request.

If input (which can include a set of multiple inputs) results in different system states, the differences or commonalities of these systems can be analyzed to determine reasons for the differences in state. Accordingly, another aspect of the subject matter described herein may include analyzing differences in variate system state caused by a given request to determine causes of the differences. For example, if two variates with different operating systems service a given request and one of the variates crashes, the different operating system and the request may be flagged for further analysis.

The creation of an array of diverse systems may not be possible in all situations. This may be the case when there is a large number of systems (scale is an issue) and/or if the systems cannot be easily replicated. Consider an Internet of Things (IoT) application consisting of a large number of diverse temperature sensors (note, diversity can be the result of different manufacturers and implementations). In this situation, it would be difficult to create an array of systems for each temperature sensor (scalability is an issue). However, it is still possible to leverage the diversity of actual sensors to help determine if an input would result in an issue. In this case, a set of the sensors (perhaps all or a chosen group) is asked if the user input has been processed before and the resulting system state. The response processing server 206 uses this "crowd sourced" result to determine if the input should be allowed for that targeted sensor. The responses of the sensors need not be stored by the sensors; rather a database (or multiple databases) can be used to store the "input and result" of sensors, if scalability permits. This is helpful in situations where sensors are unable to process or store input queries. If the sensors or other variates are capable of storing inputs and results, then the sensors or other variates may store the inputs and results and provide the results in response to requests from response processing server 206.

According to another aspect of the subject matter described herein, a history of requests and responses may be maintained by response processing server 206 or in a database separate from the response processing server 206. Responses processing server 206 may analyze the history to identify system vulnerabilities.

Exemplary Advantages n-Resilient is a new evolutionary-inspired computer management and defense system that has the following advantages.

1. Uses Redundancy to Improve Resiliency.

Multiple different instances of the critical server are fielded to ensure that single or multiple failures will not disrupt the protected service. Note that the servers may be implemented differently to reduce the impact of attacks and failures.

2. Comparing Answers from the Set of Variates Allows Automatic Threat and/or Failure Detection.

Comparing the responses from the set of variates will automatically indicate if there is an issue (failure or compromise) with a system. This includes the detection of zero-day attacks (never before encountered). Providing such situational awareness is important for administrators.

3. Continually Adapts to Changing Computing Environments.

Computing environments are rarely constant due to software additions, removals, and upgrades, and the continual introduction of new security threats. The n-Resilient approach automatically improves resiliency by continually evolving functional configurations based on the current environment; therefore, it is always adapting as the environment changes.

4. Discovers Secure Computer Configurations Based on Previously Secure Configurations.

By comparing answers from the variates, it is possible to identify those who are operating differently. These outliers may provide different responses because of how they are composed (application configuration, application, operating system, hardware, and any combination of these items). The exact difference in how the variates are composed can be quickly identified and reported to a human administrator.

5. Maintains System Diversity.

Mutation is an important process of evolutionary computing since it allows the discovery of new solutions. For n-resilient, mutation also provides diversity within the array of variates which is beneficial for resiliency and defense.

6. Assists System Administrators in Reacting More Quickly to Threats and Failures.

Presently attacks and failures may take considerable time for a system administrator to detect. Since this approach will identify threats and failures in real time, the system administrator will be able to respond in a more timely fashion.

What is claimed is:

1. A system for providing resilient computing services using implementation diversity, the system comprising:
   a head device for receiving a request from a client and for replicating the request to generate a plurality of copies of the request;
   a plurality of variates, each for receiving a respective one of the copies of the request replicated by the head device, processing the respective one of the copies of the request received by the variate, and generating a response to the respective one of the copies of the request received by the variate, wherein at least some of the variates differ in implementation from each other but are configured to perform the same function;
   a response processing server for receiving the responses from the variates, comparing responses from different variates, identifying differences among the responses, using the differences in the responses to identify configurations of variates as potential security vulnerabilities, selecting one of the responses, and delivering the response to the client via the head device; and
   a variate system modifier for changing configurations of one or more of the variates using an evolutionary algorithm to select new sets of variate configuration parameters based on parent sets of variate configuration parameters and mutations where at least one variate configuration parameter is randomly changed, wherein using the evolutionary algorithm to select the new sets of variate configuration parameters includes receiving notification from the response processing server of a variate configuration identified as a potential security vulnerability, modifying the configuration through selection, mutation and crossover processes, and selecting the modified configuration as one of the new sets of variate configuration parameters.

2. The system of claim 1 wherein the variates comprise functionally equivalent servers.

3. The system of claim 1 comprising at least one hardware platform including at least one processor and a memory, wherein the variates execute on the at least one hardware platform, wherein at least some of the variates execute on different virtual machines, which execute on the at least one hardware platform.

4. The system of claim 1 wherein the variates comprise Internet of Things (IoT) devices, at least some of which comprise sensors.

5. The system of claim 1 wherein the response processing server selects the response to be delivered to the client using a response selection algorithm that considers plural correct responses from different variates as candidates to be delivered to the client, wherein the response selection algorithm comprises a random or pseudo-random selection algorithm.

6. The system of claim 1 wherein the response processing server utilizes a history of past responses from the variates in selecting the response to be delivered to the head device.

7. The system of claim 1 wherein the variates or a separate database maintains a history of requests and responses and wherein the responses processing server analyzes the history to identify system vulnerabilities.

8. The system of claim 1 wherein the response processing server analyzes the responses for security threats or failures and, in response to detecting a security threat, the variate system modifier changes a configuration of the variate that produced the response triggering the security threat.

9. The system of claim 1 wherein the response processing server is separate from the head device and is located on a non- client-facing side of the head device.

10. A method for providing resilient computing services using implementation diversity, the method comprising:
    providing a head device for receiving a request from a client replicating the request to generate copies of the request, and sending the copies of the request to a plurality of variates;

receiving, by the variates, the copies of request replicated by the head device;

processing, by each variate, a respective one of the copies of the request received by the variate, and generating a response to the respective one of the copies of the request received by the variate, wherein at least some of the variates differ in implementation from each other but are configured to perform the same function;

receiving, by a response processing server, the responses from the variates, comparing responses from different variates, identifying differences among the responses, using the differences in the responses to identify configurations of variates as potential security vulnerabilities, selecting one of the responses, and delivering the response to the client via the head device; and providing a variate system modifier for changing configurations of one or more of the variates using an evolutionary algorithm to select new sets of variate configuration parameters based on parent sets of variate configuration parameters and mutations where at least one variate configuration parameter is randomly changed, wherein using the evolutionary algorithm to select the new sets of variate configuration parameters includes receiving notification from the response processing server of a variate configuration identified as a potential security vulnerability, modifying the configuration through selection, mutation and crossover processes, and selecting the modified configuration as one of the new sets of variate configuration parameters.

11. The method of claim 10 wherein the variates comprise functionally equivalent servers.

12. The method of claim 10 comprising providing at least one hardware platform including at least one processor and a memory, wherein the variates execute on the at least one hardware platform, wherein at least some of the variates execute on different virtual machines, which execute on the at least one hardware platform.

13. The method of claim 10 wherein the response processing server utilizes a history of past responses from the variates in selecting the response to be delivered to the head device.

14. The method of claim 10 wherein the variates or a separate database maintains a history of requests and responses and wherein the responses processing server analyzes the history to identify system vulnerabilities.

15. The method of claim 10 wherein selecting one of the responses includes using a response selection algorithm that considers plural correct responses from different variates as candidates to be delivered to the client and wherein the response selection algorithm comprises a random or pseudo-random selection algorithm.

16. The method of claim 10 comprising analyzing the responses for security threats or failures and, wherein changing the configurations of one or more of the variates comprises, in response to detecting a security threat or failure, changing a configuration of the variate that produced the response triggering the security threat.

17. The method of claim 10 wherein the variates or a separate database maintain a history of requests and responses and wherein the responses processing server analyzes the history to identify system vulnerabilities.

18. The method of claim 10 wherein the response processing server is separate from the head device and is located on a non-client-facing side of the head device.

19. A non-transitory computer readable medium having stored thereon executable instructions that when executed by a processor of a computing platform control the computing platform to perform steps comprising:

providing a head device for receiving a request from a client, for replicating the request to generate copies of the request, and for sending the copies to a plurality of variates;

receiving, by the variates, the copies of request replicated by the head device;

processing, by each variate, a respective one of the copies of the request received by the variate, and generating a response to the respective one of the copies of the request received by the variate, wherein at least some of the variates differ in implementation from each other but are configured to perform the same function;

receiving, by a response processing server, the responses from the variates, comparing responses from different variates, identifying differences among the responses, using the differences in the responses to identify configurations of variates as potential security vulnerabilities, selecting one of the responses, and delivering the response to the client via the head device; and providing a variate system modifier for changing configurations of one or more of the variates using an evolutionary algorithm to select new sets of variate configuration parameters based on parent sets of variate configuration parameters and mutations where at least one variate configuration parameter is randomly changed, wherein using the evolutionary algorithm to select the new sets of variate configuration parameters includes receiving notification from the response processing server of a variate configuration identified as a potential security vulnerability, modifying the configuration through selection, mutation and crossover processes, and selecting the modified configuration as one of the new sets of variate configuration parameters.

20. The non-transitory computer readable medium of claim 19 wherein the response processing server is separate from the head device and is located on a non-client-facing side of the head device.

21. A method comprising:

transmitting a request from a client device to a head device, which receives the request, replicates the request to generate a plurality of copies of the request, and sends the copies to a plurality of variates, wherein the variates receive the copies of request replicated by the head device, each variate processes a respective one of the copies of the request received by the variate and generates a response to the respective one of the copies of the request received by the variate, wherein at least some of the variates differ in implementation from each other but are configured to perform the same function, a response processing server receives the responses from the variates, comparing responses from different variates, identifying differences among the responses, using the differences in the responses to identify configurations of variates as potential security vulnerabilities, selects one of the responses to be delivered to the client device via the head device, and transmits the selected one of the responses to the client device;

receiving the selected one of the responses by the client device; and providing a variate system modifier for changing configurations of one or more of the variates using an evolutionary algorithm to select the new sets of variate configuration parameters based on parent sets of variate configuration parameters and mutations where at least one variate configuration parameter is randomly changed, wherein using the evolutionary algorithm to select the new sets of variate configuration parameters includes receiving notification from the response processing server of a variate configuration identified as a potential security vulnerability, modifying the configuration through selection, mutation and crossover processes, and selecting the modified configuration as one of the new sets of variate configuration parameters.

22. The method of claim 21 wherein the response processing server is separate from the head device and is located on a non-client-facing side of the head device.

\* \* \* \* \*